United States Patent [19]

Barley et al.

[11] Patent Number: 5,073,780

[45] Date of Patent: Dec. 17, 1991

[54] COOPERATIVE PASSIVE IDENTIFICATION SYSTEM FOR MOVING OR STATIONARY OBJECTS

[75] Inventors: Thomas A. Barley; Pierre M. Alexander; Gustaf J. Rast, Jr., all of Huntsville, Ala.

[73] Assignee: The United States of America as represented by the Secretary of the Army, Washington, D.C.

[21] Appl. No.: 458,008

[22] Filed: Dec. 22, 1982

[51] Int. Cl.$^5$ .................... G01S 13/78; G01S 13/80
[52] U.S. Cl. ............................ 342/45; 342/192; 342/193
[58] Field of Search ............. 343/18 D, 5 SA; 342/6, 342/42, 44, 45, 51, 192, 193, 13, 90

[56] References Cited

U.S. PATENT DOCUMENTS

| | | | |
|---|---|---|---|
| 2,443,643 | 6/1948 | Schelleng | 342/350 |
| 2,917,740 | 12/1959 | Ramsay | 342/416 |
| 3,295,132 | 12/1966 | Chapman, Jr. | 342/6 |
| 3,371,345 | 2/1968 | Lewis | 342/6 |
| 3,660,843 | 5/1972 | Wolff | 342/6 |
| 3,750,173 | 7/1973 | Tackman | 342/169 |
| 3,913,099 | 10/1975 | Wehner et al. | 342/192 |
| 3,983,558 | 9/1976 | Rittenbach | 342/160 |
| 4,035,797 | 7/1977 | Nagy | 342/104 |
| 4,101,890 | 7/1978 | Goyard | 342/193 |
| 4,370,654 | 1/1983 | Krutsch | 342/6 |
| 4,484,193 | 11/1984 | Bellew | 342/98 |
| 4,490,718 | 12/1984 | Opitz et al. | 342/192 |
| 4,641,137 | 2/1987 | Opitz et al. | 342/52 |
| 4,641,138 | 2/1987 | Opitz | 342/61 |
| 4,673,940 | 6/1987 | Barley et al. | 342/192 |
| 4,918,458 | 4/1990 | Brunner et al. | 343/795 |

Primary Examiner—John B. Sotomayor
Attorney, Agent, or Firm—Freddie M. Bush; Howard G. Garner

[57] ABSTRACT

This method can be used either as an independent radar system or as an adjunct to an existing radar system, after suitably modifying the existing system, and will provide a cooperative, Radio Frequency passive, identification system for either stationary or moving targets. The system uses suitable devices that will mechanically vibrate as a transponder mechanism as an attachment to stationary or moving targets. A sideband analyzer is used to identify the viberation pattern in the radar return, and therefore, identifies the target.

9 Claims, 6 Drawing Sheets

COOPERATIVE PASSIVE IDENTIFICATION SYSTEM FOR MOVING OR STATIONARY OBJECTS

DEDICATORY CLAUSE

The invention described herein may be manufactured, used, and licensed by or for the Government for governmental purposes without the payment to us of any royalties thereon.

BACKGROUND OF THE INVENTION

It has been a desired goal in the field of radar technology for many years to extend the data processing capability of the radar system to the point wherein the characteristics of the target can be used as an identification function. However, with the dispersion of identical types of military equipments to many countries which are now friendly, but could easily someday in the future become hostile, simple basic parameter identification of a target of interest may not be sufficient to accomplish an identification task. It can easily be projected that the time may come when positive identification is an absolute necessity. The anticipation of this potential requirement, and, in conjunction with work currently under way in identifying objects by their characteristic, FM modulations of the impinging transmitted signal by the targets surface vibrations has led to consideration of a system of coded vibration. Thus we not only examine the basic vibrations of a target but we can establish a coded vibrating system that will positively identify the target.

The problem of target detection has compassed many modes of identification using an array of parameters and processing schemes. The U.S. Air Force realized many years ago that they had an absolute requirement for positive aircraft identification. The aircraft have had a number of different transponder type schemes that require radiating sources and expensive equipment that requires sophisticated maintenance. It has been discovered that the identification process can be done on a cooperative passive basis using simple techniques with a minimum hardware sophistication and expense.

The discovery of a cooperative passive target technique is basically an offshoot of work dealing with detection of target vibrations. Once the basic concept of mechanization is understood for detection of target surface vibration, the next step is to try to create a controlled vibration system that can involve optimizing deflection of moving elements to maximize the FM sideband structure created by the surface movement. For example, it can be shown that the maximum first order sideband occurs when the ratio of signal wavelength to target displacement amplitude is approximately seven (7). However, under this particular condition, sidebands out to tenth order and beyond have to be considered in detecting the vibration effects on the impinging signal. Optimizing therefore implies more than designing the vibration deflection magnitude for maximum sideband generation.

SUMMARY OF THE INVENTION

The system is based upon using a suitable device that will mechanically vibrate as a transponder mechanism as an attachment that can be attached to stationary or moving targets. The radar system, as a function of its basic operation will acquire a target. The transponding device will be a mechanically assembled array of suitably vibrating elements that modify the transmitted radar signal by frequency modulating the reflected signal that forms the radar target return. If a sufficient number of independent vibrating elements are used in this transponder, a huge number of different modulation patterns can be generated on the target return signal.

DESCRIPTION OF THE BEST MODE AND PREFERRED EMBODIMENT

Figure 1:
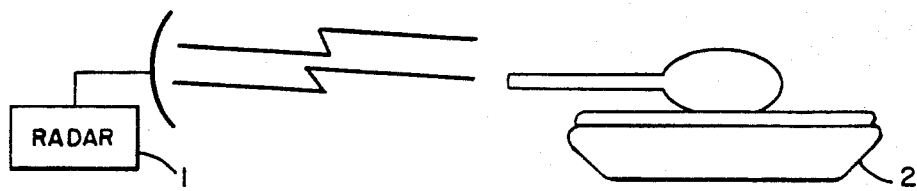
FIG. 1 illustrates a typical radar identification and tracking operation.
Figure 2A:
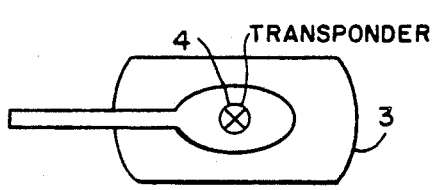
FIGS. 2A and 2B illustrate a possible location of a transponder on a tank target.
Figure 2B:
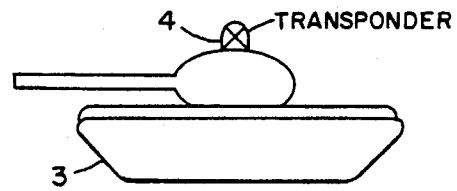
Figure 3:
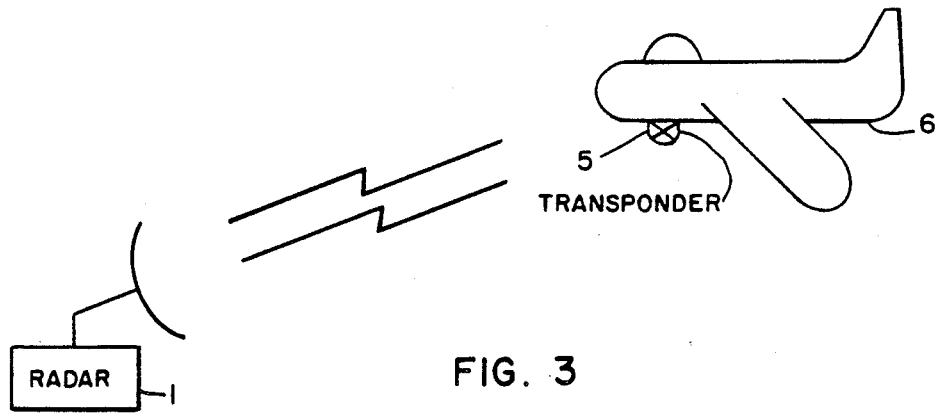
FIG. 3 illustrates a method for aircraft identification using a vibrating unit.

FIG. 1 shows a typical radar operation. The elements are primarily the radar 1, a number of undesired energy return objects (not shown), the desired target 2 and perhaps other transmitting sources that interfere either accidentally or intentionally. The general purpose of a radar is depicted in FIG. 1 where the radar locates a target by one of several means, identifies the target and then either ignores the target or tracks it. It is in the process of identification and tracking that problems arise. If, as depicted in FIG. 2, a target 3 such as a tank is equipped with a response mechanism 4 that can easily modulation code an impinging radar signal with known modulation formats, the identification function becomes a relatively easy matter. In FIG. 3, the concept is classified a little further in that the radar is shown tracking a transponder element 5 on an aircraft 6. It is important to note at this point that a transponder of the type that is being suggested is strictly a mechanically vibrating surface where the vibration frequencies are controlled by any of a number of techniques to establish a unique coded return to the radar. Thus movement of any type by the target would not be required to identify a target, providing the transponder is working. A unique feature of this type of a system is the absence of any radiation generated by the target. This transponder simply has an inherent mechanical vibration pattern that a suitably designed radar can detect and use to identify the target.

Figure 4:
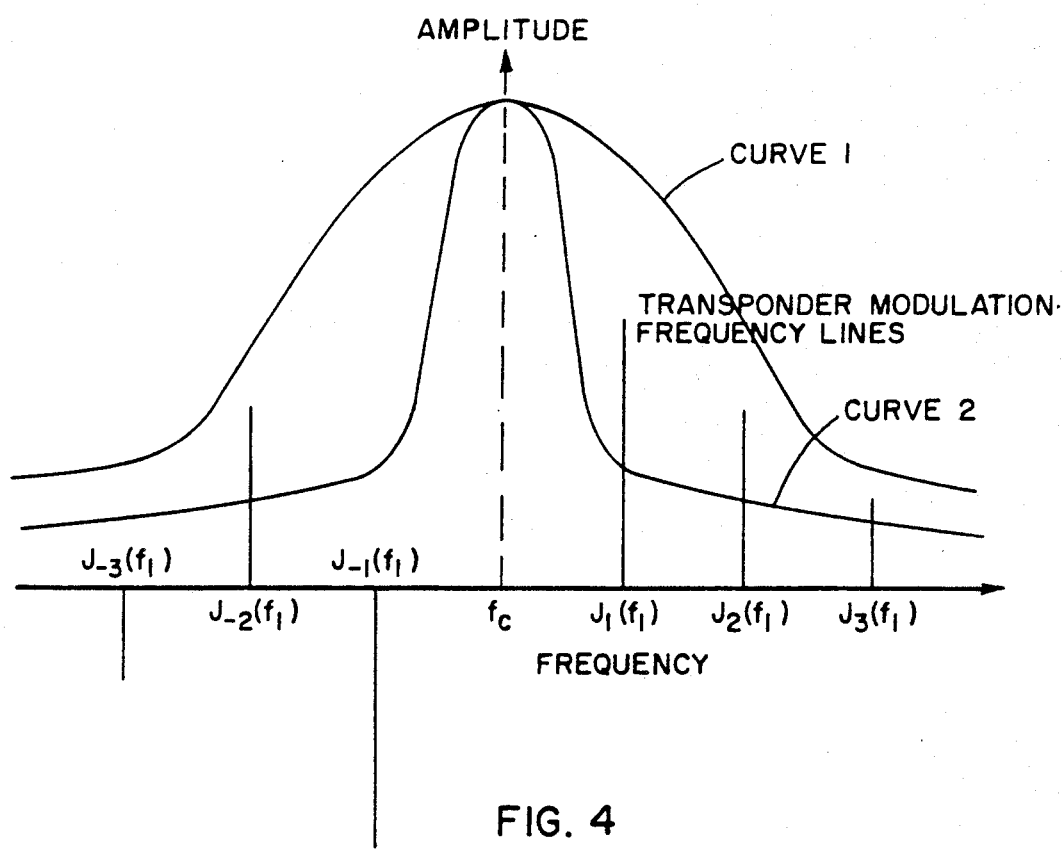
FIG. 4 illustrates a typical CW transmitter near spectral display with third order FM sidebands shown.

Some of the general parameters of the radar and of the transponder will now be discussed. One of the first things that needs to be recognized is that this concept could be built as an independent and complete system or it could easily become an added capability to an existing radar system, provided the parent system had suitable parameters needed to support system operation. One of the key basic components that the radar must have is a suitable transmitter. Consider the concepts portrayed in FIG. 4. If the transmitter has a near carrier FM noise pattern as indicated by energy envelope curve 1, the modulation induced by the transponder will be buried in the noise and will not be detected by the radar receiver. Hence, if a radar is to be used with a vibrating surface transponder, it will need a power spectral distribution on the order of that depicted by curve 2. Several possible FM spectral return lines have been indicated at arbitrary points to aid in understanding the relationship of the modulation spectral distribution as compared to the natural FM noise distribution of the radar system. In general, the radar FM spectral noise power distribution is required to be less than the magnitude of the transponder induced sideband spectral power by some suitable power ratio, otherwise signal processing becomes unduly complicated in a practical system.

Figure 5:
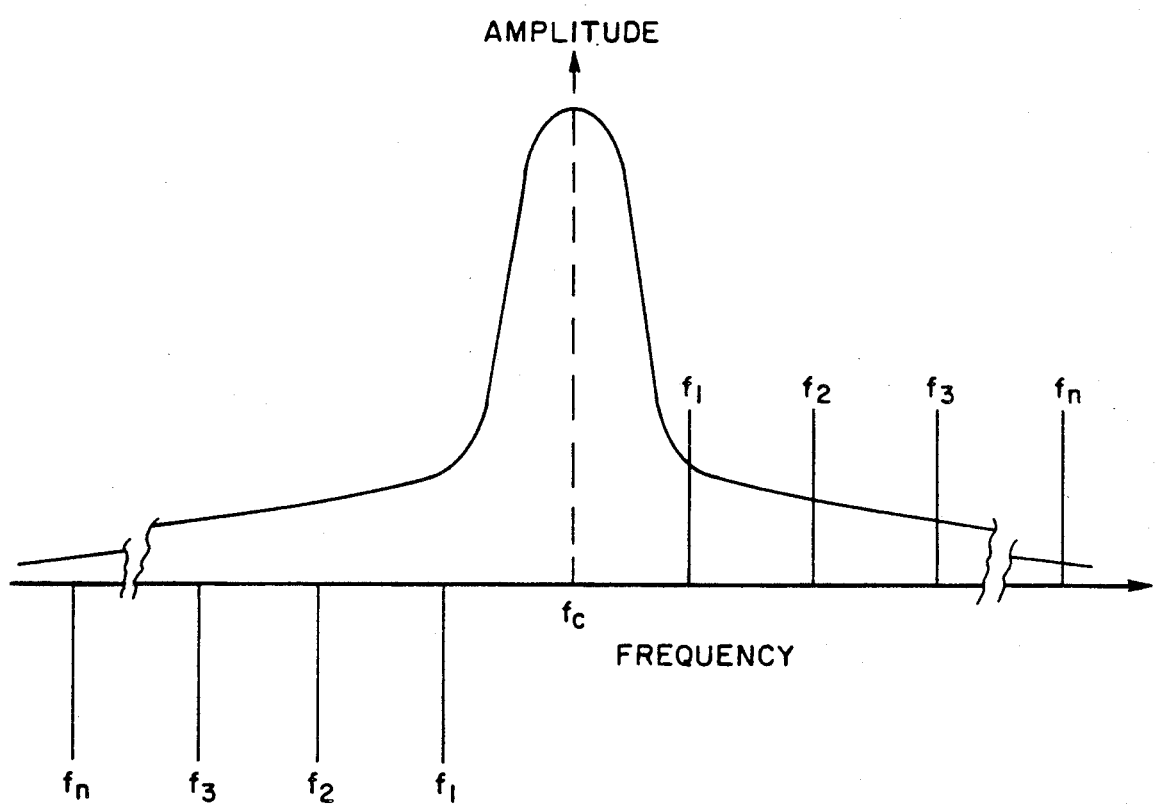
FIG. 5 illustrates a first order sideband modulation of the transmitted signal after reflecting off the passive identification transponder unit.

There are a number of things that must also be understood clearly about the relationship between the transmitted signal, the transponder and the receiver if a successful system is to evolve. FIG. 5 assumes a transmitted signal that meets the power spectral distribution requirements for a successful system. A number of modulation lines are shown as different modulation rates where the magnitude of modulation by the transponder is such that only the first order sidebands are of consequence. It can easily be seen that opportunity abounds to accomplish many varied digital and analog modulation patterns of such a signal to accomplish an identification pattern.

Figure 6:
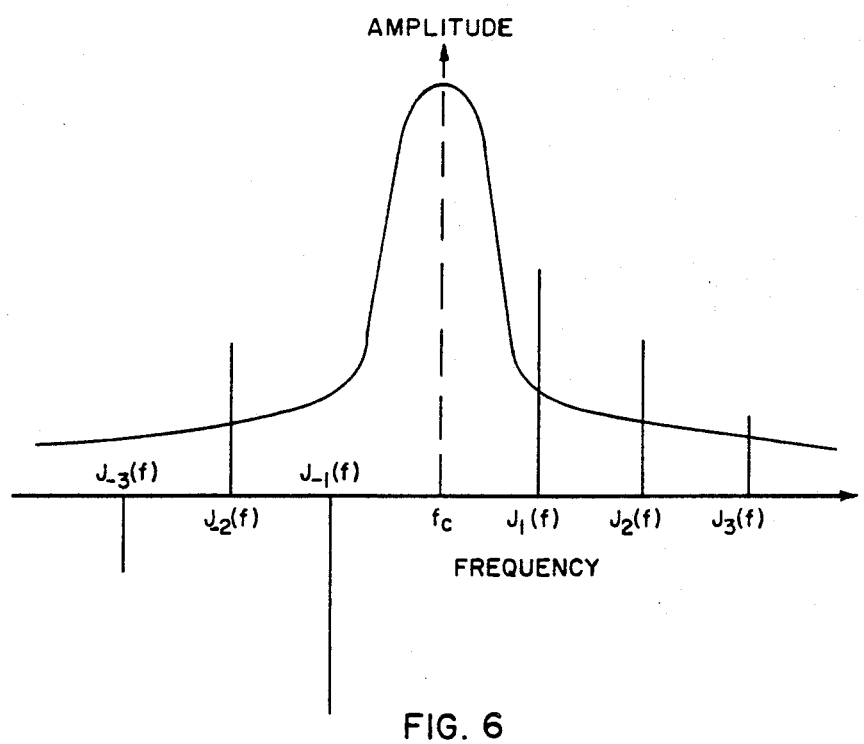
FIG. 6 illustrates one sideband modulation frequency with large modulation index.
Figure 7:
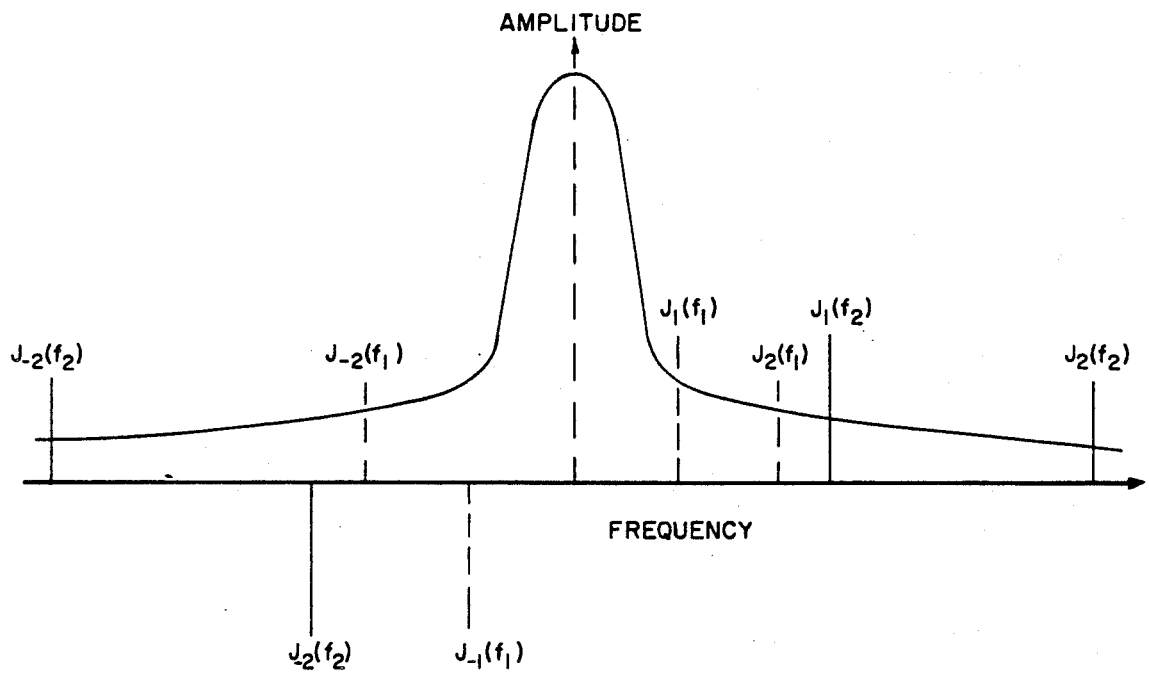
FIG. 7 illustrates a potential sideband structure with modulation index that permits a significant second order turn.

FIG. 6 depicts a case similar to that shown in FIG. 5 except that only one frequency is modulating the transmitter signal. The difference between FIGS. 5 and 6 are fundamental to the understanding of this method. In FIG. 5 N frequencies were modulating the signal at a modulation index that permitted consideration of only the first order sidebands. However as the modulation index increases, higher ordered sideband pairs can no longer be ignored. In addition to not being able to ignore the higher ordered sidebands, it should be noted that a phasing pattern exists in the sideband pairing structure that can create problems unless provision is made to adequately handle the situation. A potential problem arises in the modulation frequency of the various eielments of the transponder. These frequencies must not be integral values of each other. If integral multiples of $f_1$ exist in the transponder, the higher ordered sidebands of $f_1$ will interfere with any integral value of $f_1$. Thus we can not permit a situation where $Nf_1 = f_n$ exists. This is not a difficult requirement but it is a necessary requirement for a successful system. We simply cannot tolerate interference patterns to be established between first ordered sidebands and Nth ordered sidebands from another basic vibrating element. It is easy to select frequencies that meet this requirement. FIG. 7 indicates a method of selecting modulation frequencies that will not cause interference. It is pertinent to understand that if certain types of modulation patterns are used to code the transponder, some sideband interference can be expected. However, if the possible interferences are properly handled, interference will not be a problem. The interference problem can be a disaster if a system were designed for fixed modulation rates with out a means of shifting the modulation frequencies through changing the vibration characteristics of the transponder. This subject of interference has been exposed because it can occur unless the potential ramifications are understood and considered when the system is implemented for a specific design. It also must be understood that the radar does not have any control over the modulation amplitude of the transponder, thus the transponder design must consider the parameters that are required for optimizing the operational mode desired, at the operating frequency of the radars that are using this augmentation scheme.

Figure 8:
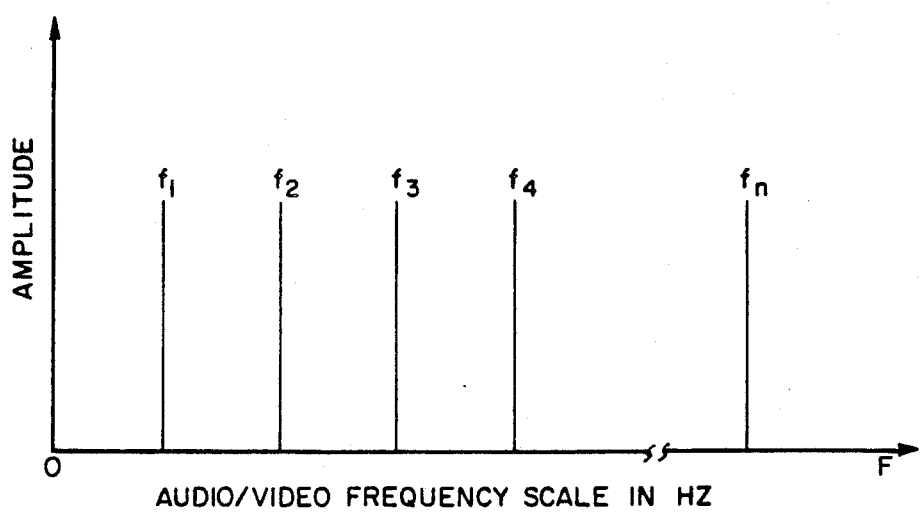
FIG. 8 illustrates frequency display of N vibration frequencies after proper detection.

Returning to the spectral distribution shown in FIG. 5, it is necessary to understand that any amplitude modulation existing simultaneously with the frequency modulation must be adequately suppressed or basic vibration information can be appreciably altered. One suitable technique for accomplishing this function is inherently accomplished in near carrier analyzers such as described in U.S. Pat. No. 4,002,971 and other similar concepts. Once a suitable near carrier analyzer has been selected, the baseband detection process provides a data presentation as depicted in FIG. 8. The representation in FIG. 8 will hold regardless of whether a target is standing absolutely still or whether it is moving. The only difference in the case of a target standing still and a target moving is in the position of the spectral lines. The spectral lines will shift to compensate for the doppler shift of the target, however, the spectral lines from the transponder will not change themselves unless the target movement cause changes in the transponder vibration pattern.

Figure 9:
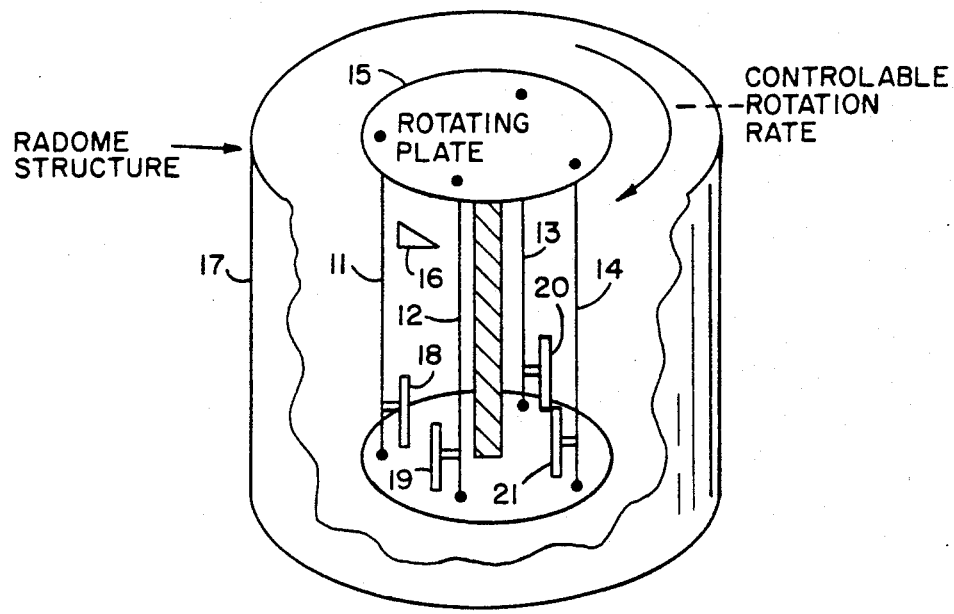
FIG. 9 illustrates one embodiment of a implementing passive cooperative transponder.

One possible mechanical transponder that will work for this type usage is shown in FIG. 9. Basically the function that must be implemented is to have a surface that has sufficient movement. In FIG. 9, four vibrating wires, cords or rods 11-14 are shown that will vibrate at different frequencies. The vibrating elements which must be electrical conductors, are mounted on a spool type structure 15 that can itself be turned or rotated at various rates to provide coded information. One of many methods of inducing vibrations into these cords is to use techniques similar to those used by musicians in the operation of a stringed instrument. For example, the cords could be plucked mechanically by a pick 16 mounted on the radome 17 same time having the string stopped along the bridge length to establish the vibration rate. The tension of members 11-14 could also be controlled. There is absolutely no attempt herein to suggest that this type transponder represents an optimum type unit. Rather, an attempt is being made to demonstrate the simplicity and the wide range of potential design possibilities available to implement a simple but rugged unit that requires very little complex maintenance.

Figure 10:
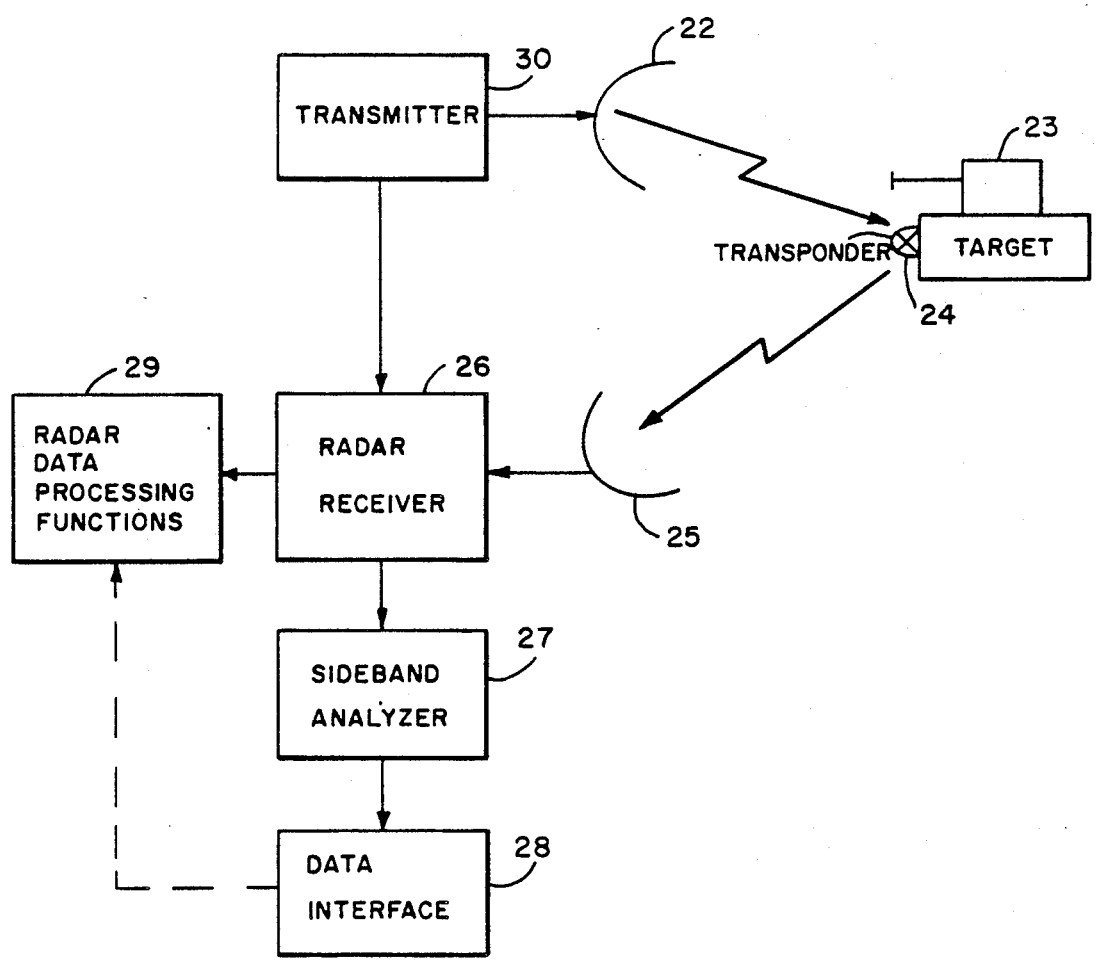
FIG. 10 is a block diagram illustrating a CW radar implemented to process FM passive transponder data.

The discussion concerning the use of a CW type radar as the processing radar in this target detection and identification will utilize FIG. 10 for purposes of describing the required operations. The CW radar must have a stable, spectral suitable power output from stable transmitter 30. The discussion of spectral power density suitability was addressed prior to this discussion. A sample of this transmitted power is sent to the radar receiver 26 for use in processing the radar signal that is reflected from the target. The main portion of the signal from stable transmitter 30 is routed to transmitting antenna 22 to permit propagation of the radar signal through the atmospher to the target. The function associated with target acquisition by the radar will not be discussed herein because the primary functions served by this method involve target identification and tracking. Thus it is assumed that the radar has already acquired the target and the identification and tracking functions are to be done. The radar signal is thus already being reflected by target 23 and transponder 24 that is mounted on target 23. Transponder 24 places a distinctive modulation pattern on the transmitted signal that impinges on the transponder. The transmitted signal receives frequency modulation from the mechanical movement of the transponder elements and the signal reflected back to the radar has the distinctive transponder code in the form of a frequency modulation pattern that may have either a simple or an elaborately complex coding depending upon how the particular transponder is implemented for operation. The signal returned from the target 23, transponder 24 combination is received as a propagated wave by receiving antenna 25 and routed to receiver 26 where the radio frequency signal is converted to a suitable intermediate frequency signal. Since this radar is stable and uses a sample of the transmitted signal as a reference, receiver 26 has an intermediate frequency that is also stable and as coherent as the basic transmitted frequency. Receiver 26 routes part of the signal through normal well known radar signal processing equipments that perform the required radar functions as noted by the radar data functions 29. In addition, receiver 26 sends part of the received signal, at a sufficient power level, to a suitable sideband analyzer 27 to extract the modulation data placed upon the transmitted signal by transponder 24. Once the frequency modulation sidebands have been extracted by sideband analyzer 27, this data is sent to data interface unit 28 to suitably format the information for use in radar data processing functions unit 29.

Further clarification of this operation can be made if an arbitrary modulation is assumed where only three of the four cords on the transponder are vibrating and the transponder is not rotating. This is possibly one of the simplest possibilities but it adequately describes the operational method. If the simple a priori knowledge exists, as it must, that four signals are available and that the transponder is operating in this specific case in this short time span at three predetermined modulation or vibrating rates, then the process is quite simple and direct. Near carrier analyzer 27 will extract the three frequencies at the three required positions and note that the fourth frequency is not activated and that transponder 24 is not rotating. Since this would satisfy all existing requirements for this example, the proper interface information would be routed to the radar data function unit 29 indicating that fact. In a military situation, this could be used for at least two purposes. After the target is identified, it could be rejected as an enemy target, allowing processing to continue in search of a target that did not have the correct coded response. Absence of a correctly coded response could serve as the means for designating the target as an enemy. Another use for this coded return could be in air traffic control where each aircraft is suitable coded to provide a separate code for each aircraft. Then as the radar picks up each target, the target is identified automatically by its code reply. This provides a very inexpensive means of locating and identifying all aircraft in a operating area such as the vicinity near an airfield for air traffic control purposes. Another, and perhaps more enticing application, is to place that CW radar on the Air Force Aircraft that is assigned to a close air support role of ground troops in an area where it is known that both friendly and enemy troops and vehicles are interspersed due to changing battle lines. The simple step of placing transponders on each friendly vehicle permits the pilot to have detailed information on which targets are friendly and which are enemy. It can easily be seen that a little a priori planning before the air support strike could provide precise positional data on where to place the airstrike support munitions. One or more of the friendly vehicles could use a more sophisticated code to provide precise location information on where to place the air delivered munitions. The simple fact that these transponders can be made inexpensive and could be widely used on ground vehicles could provide an entirely new dimension in armament delivery capability while reducing the vulnerability of friendly equipment and troops. The utilization of a constantly updating code structure format could complicate the problem for the case where an enemy captured a piece of friendly equipment. A little logical thought will show that all sorts of methods can now be used to separate the enemy and tried through logical functional coding procedures in combination with coordination through other communication links. This system possesses capabilities and flexibilities that simply do not exist in the current battlefield.

It is furthermore interesting to note that while none of the current radars have this capability, this type of operation could be easily integrated into a HAWK ICWAR with a minimum amount of modification. Thus the capability of a fielded system could be greatly enhanced by a relatively small cost modification to an existing system. On the other hand, a complete radar system could be built with this type function as a primary role. Hence this method has wide potential application both in new and existing equipment roles.

A PREFERRED EMBODIMENT USING A PULSED RADAR

Figure 11:
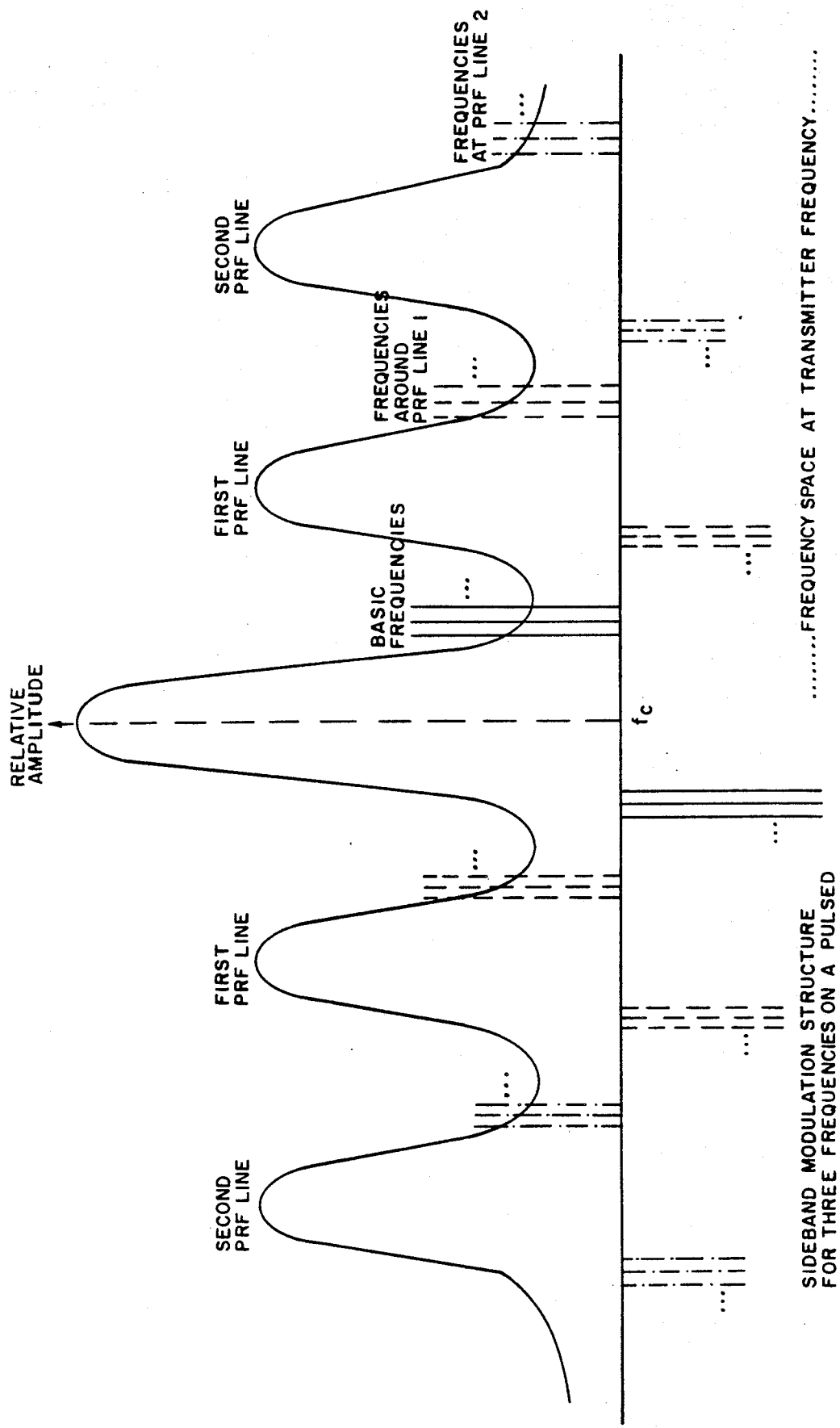
FIG. 11 illustrates a pulse radar frequency spectrum display from a transponder with vibrating elements.
Figure 12:
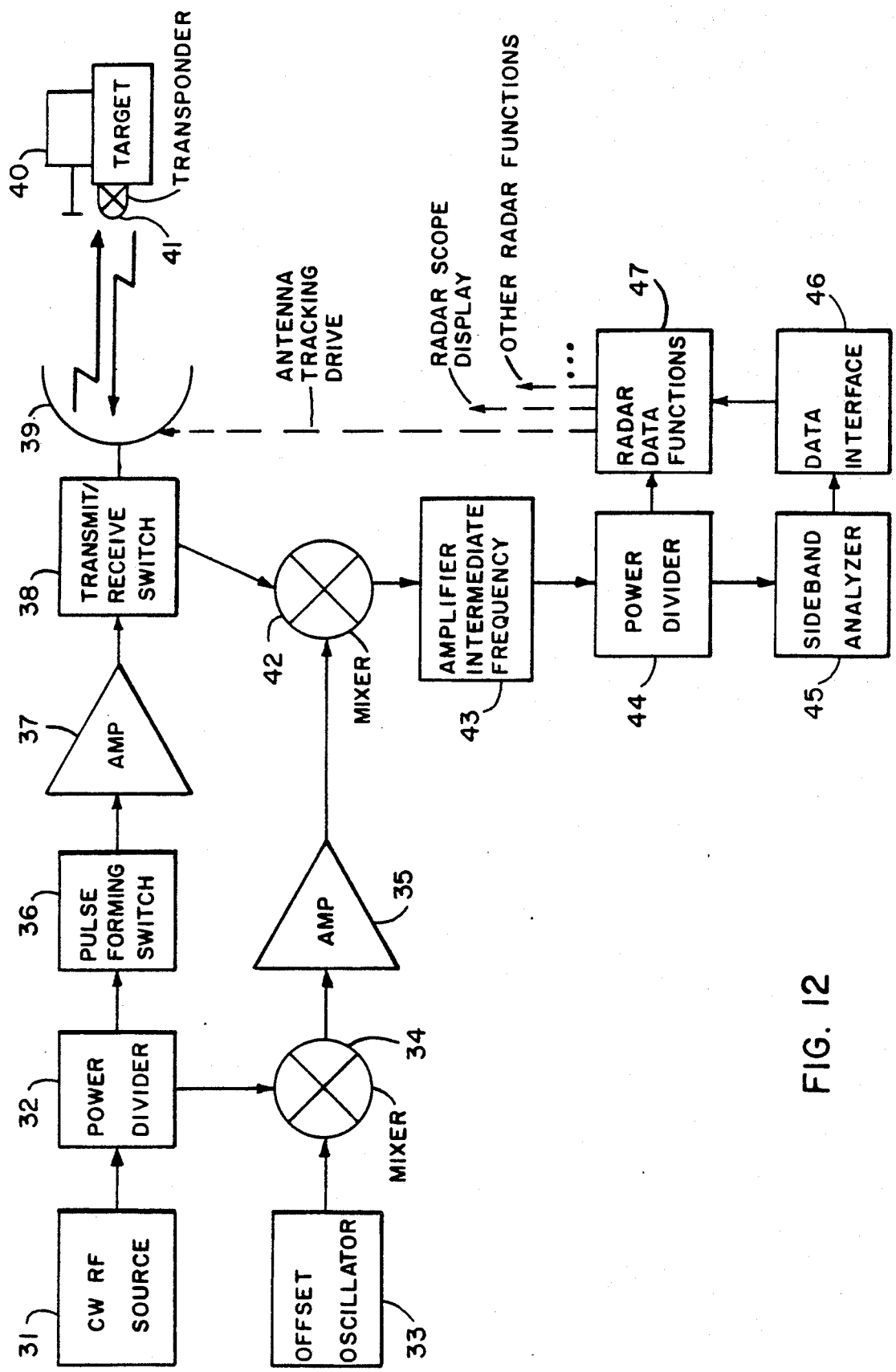
FIG. 12 illustrates a block diagram of a pulse radar embodiment to process FM passive transponder data.

The discussion concerning the use of a pulsed type radar as the processing radar in this target identification and tracking method will utilize FIGS. 11 and 12 for purposes of describing the required operations. In the case of a pulsed radar, a different type of transmitted spectrum occurs. The requirement for a spectrally clean and stable transmitter still exists but in lieu of the spectral displays of the transmitted radio frequency spectrum that have been discussed, the type spectrum shown in FIG. 11 will be encountered. The basic difference is that spectral displays not only occur around the carrier line but also around each PRF spectral line. Unless considerable care is taken in the implementation of this method considerable interference could result. However, with logical design and application techniques this method can be adapted to a pulsed radar successfully.

The pulsed radar must have a stable transmitter source. The best way to do this within the constraint of currently available hardware capabilities is to start with a CW RF Source 31 that meets all the basic parameters required from stability through near carrier power spectral density distributions. The power from this source would go to power divider 32 where it is split up with part going to mixer 34 and the remainder going to pulse forming switch 36. A second CW offset oscillator 33 with suitable power and spectral parameters is used to generate a signal that is sent to mixer 34 which when combined with the signal from power divider 32 will generate sidebands that leave mixer 34 and are applied to amplifier 35. Amplifier 35 is a bandpass amplifier that amplifies only the selected sideband for use as a local oscillator drive in mixer 42.

The output from power divider 32 that goes to pulse forming switch 36 is processed by the switching network to generate pulses with pulsewidths and PRFs suitable for the radar's operational requirements. After these pulses have been formed by pulse forming network 36 they are amplified by amplifier 37 and routed through transmit/receive switch 38 whose task is to protect mixer 42 during a pulse transmit operation and permit receive pulse returns to be processed by mixer 42. The pulse continues on to antenna 39 where they are converted into propagating electromagnetic waves that are shaped by the antenna beam pattern. These waves propagating from antenna 39 continue to travel away from the antenna until a target is present to reflect a portion of the transmitted power back to the antenna. Although this system will do an acquisition function as a radar, it will be assumed that the target has already been acquired and the system is ready to identify and track. The signal from antenna 39 is intercepted by target 40 that has attached to it transponder 41. The elements of transponder 41 will be sufficiently predominant over all other energy returned to the point where the signal of interest is the FM sideband modulation generated by the vibrating element in transponder (See FIG. 9.) This coded vibration data, now in the form of FM sideband modulation data on the reflected electromagnetic wave is received at antenna 39, routed through transmit/receive switch 38 and sent to mixer 42. Mixer 42 translates the incoming carrier and its modulation pattern to the selected intermediate frequency where it is suitably amplified in intermediate frequency amplifier 43. After suitable amplification, the output from intermediate frequency amplifier 43 goes to power divider 44 for distribution to radar data and control function 47 that accomplish all the desired radar functions, and also for distribution to sideband analyzer 45. Near carrier analyzer 45 extracts the FM sideband modulation data and sends this data to data interface 46 where the data is properly arranged to be utilized by the radar when it is sent on to radar data and control functions 47. The various functions that are commonly done by the radar will be augmented to permit target identification and aided tracking as required. The example used in the case of the CW radar implementation is also generally applicable to this case.

A significant feature of the transponder is that it can be manufactured economically, this permitting the cost effective option of equipping all friendly vehicles on a battlefield with a suitable transponder that can easily provide independent codes to identfy each target. Since the code can be changed or programmed as desired, it would be easy to keep a continuously changing code pattern implemented, thus providing effective countermeasure-resistant capabilities. Since the transponder does not radiate radio frequency energy, it cannot be passively detected. An enemy radar system without siutable modifications could not detect the transponder. Nor would he have access to the code-of-the-day. A cost effective identification system such as this permits identification capabilities that are limited only by the ingenuity of the user.

We claim:

1. A method of identifying targets with a radar system, comprising the following steps:

(a) providing each of the targets to be identified with a passive transponder, having at least one vibrating element;

(b) vibrating said vibrating element in a predetermined pattern to provide a signature for its target;

(c) causing said radar system to broadcast a radar signal towards said target;

(d) impinging said radar signal on the surface of said target and said passive transponder vibrating element;

(e) reflecting said radar signal from said target surface and said transponder vibrating element to produce a mixed signal containing reflections of said radar signal from said target and from said vibrating element;

(f) receiving said mixed signal;

(g) processing said mixed signal to separate the signals reflected from said vibrating element from those reflected from said target surface;

(h) analyzing the signals reflected from said vibrating element with a side band analyzer for identifying the signature of said transponder; and (i) comparing said analyzed signature with known transponder signatures to determine if said target is known.

2. A method of identifying targets with a radar system, comprising the following steps:

(a) providing each of said targets to be identified with a passive transponder having a plurality of vibrating elements, each of which has its own characteristics;

(b) vibrating said vibrating elements in a predetermined coded pattern to provide a signature for its target;

(c) causing said radar system to broadcast a radar signal towards said target;

(d) impinging said radar signal on the surface of said target and on said plurality of vibrating elements;

(e) reflecting said radar signal from said target surface and from said vibrating elements to produce a mixed signal containing reflections of said radar signal from said target surface and from said vibrating elements;

(f) receiving said mixed signal;

(g) processing said mixed signal to separate the signals reflected from said vibrating elements from those reflected from the surface of said target;

(h) analyzing the signals reflected from said vibrating elements with a side band analyzer for identifying the signature of said transponder; and (i) comparing said analyzed signature with known transponder signatures to determine if said target is known.

3. A system for identifying a target using radar signals, comprising:

(a) means for generating a radar signal and for transmitting said radar signal towards said target;

(b) a passive transponder disposed on said target for reflecting radar signals impinging thereon;

(c) at least one element supported on said transponder for vibration;

(d) means for vibrating said one element in a predetermined pattern to modulate an FM side band of said radar signal reflected from said transponder in a predetermined signature pattern;

(e) receiver means for receiving mixed radar signals reflected from said target and said transponder;

(f) a side band analyzer connected to said receiver means for separating the signals reflected by said vibrating means from those reflected by the surface of said target; and (g) means connected to said side band analyzer for detecting signature patterns and comparing said detected patterns to known signature patterns to determine whether said target is known.

4. A system as set forth in claim 3, wherein said transponder comprises a plurality of elements supported for selected vibration by said vibrating means in a predetermined coded signature pattern.

5. A system as set forth in claim 3, wherein said vibrating element comprises an elongated electrical conductor.

6. A system as set forth in claim 4, wherein said plurality of elements are supported on a disc which, in turn, is supported on said transponder for rotation at a controlled rate.

7. A system for identifying a target using radar signals, comprising:

(a) means for generating a radar signal and for transmitting said radar signal towards said target;

(b) a passive transponder disposed on said target for reflecting radar signals impinging thereon;

(c) a plurality of elements supported on said transponder for vibration;

(d) means for vibrating each of said vibrating elements in a predetermined coded pattern to modulate an FM side band of said radar signal reflected from said transponder in a predetermined signature pattern;

(e) receiver means for receiving a mixed radar signal reflected from the surface of said target and from said vibrating elements;

(f) a side band analyzer connected to said receiver means for separating said signature pattern of reflections from said vibration elements from the reflections from the surface of said target; and (g) means connected to said side band analyzer for comparing said separated signature pattern with known transponder signatures for identifying said target.

8. A system as set forth in claim 7, wherein said vibrating elements comprise elongated electrical conductors.

9. A system as set forth in claim 8, wherein said plurality of elongated electrical conductors are supported on a disc mounted for rotation on said transponder and includes means for rotating said disc at predetermined rates.

* * * * *